Oct. 21, 1952     H. P. PHILLIPS     2,614,899
PISTON RING
Filed May 7, 1951
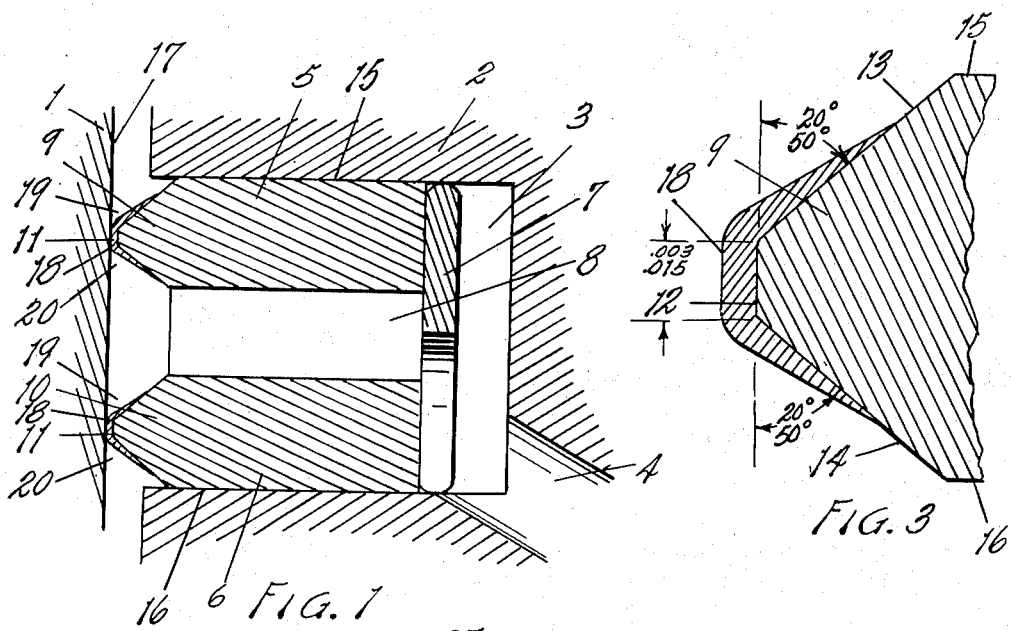
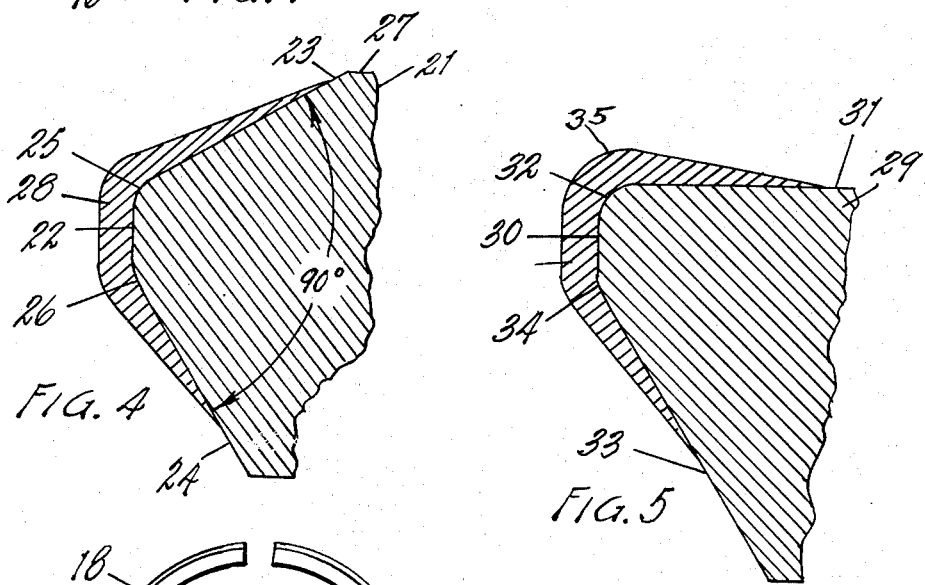
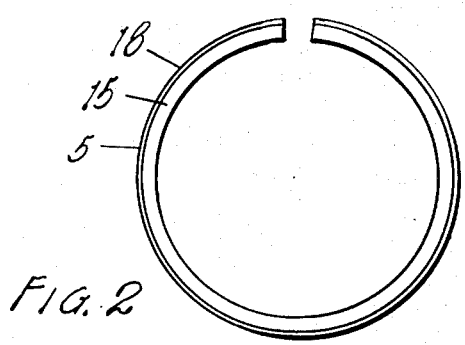
INVENTOR.
Harold P. Phillips
BY
Otto A. Earl
Attorney.

Patented Oct. 21, 1952

2,614,899

UNITED STATES PATENT OFFICE 2,614,899

PISTON RING

Harold P. Phillips, Hastings, Mich., assignor to Hastings Manufacturing Company, Hastings, Mich.

Application May 7, 1951, Serial No. 224,985

9 Claims. (Cl. 309—45)

1

This invention relates to improvements in piston rings.

The main objects of the invention are:

First, to provide a piston ring element so constructed and so conformed as to facilitate high unit pressure against a cylinder wall, close seating to the cylinder wall upon initial operation when first installed, effectual sealing for increased piston pressure, and improved lubrication at its bearing point with a cylinder wall for long life.

Second, to provide a piston ring of the above type which may be readily and economically produced to exact shape and dimensions.

Further objects relating to details and economies of my invention will appear from the description to follow.

A structure embodying the features of my invention is illustrated in the accompanying drawings, wherein:

Fig. 1 is a view showing in vertical section a cylinder, a cylinder wall and a piston ring assembly in assembled relation to the cylinder and cylinder wall.

Fig. 2 is a plan view of the ring element of Fig. 1.

Fig. 3 is an enlarged fragmentary view showing in vertical section one of the cylinder wall engaging portions of the ring element of the assembly shown in Fig. 1.

Fig. 4 is an enlarged fragmentary view of another embodiment of the invention showing in vertical section the cylinder wall engaging portion of a ring element.

Fig. 5 is a view similar to that of Fig. 3 of a further embodiment of the invention.

The embodiments of the invention herein disclosed are in general modifications of those disclosed in my Patent #2,511,874.

In considering the accompanying drawing it should be borne in mind that no attempt has been made to show the parts in relative dimensions and proportions. Relative dimensions and proportions have been exaggerated for convenience in illustration.

Referring to the embodiment of the invention shown in Figs. 1, 2 and 3, 1 designates a cylinder and 2 a piston having a ring groove 3 provided with the usual oil drain openings or passages 4. The ring groove receives the ring assembly designated generally by the numeral 5. The ring assembly comprises the ring element 6 and expander spring 7. The ring element is formed of cast iron and is of split annular shape and has inherent resilience to expansibly engage the cylinder wall. Oil passageways 8 extend radially

2 through the ring element. The expander spring 7 is the split annular type such as is disclosed in my aforesaid patent and Patent #2,404,862. This expander acts to force the ring element 6 with increased force against the cylinder wall 1.

The ring element 6 is provided with an upper annularly shaped radially outwardly projecting cylinder wall engaging portion 9 and an axially spaced similarly shaped lower cylinder wall engaging portion 10. Chromium plating 11 is electrolytically deposited on the outer peripheries of the annular portions. The peripheries of the annular portions 9 and 10 upon which the chromium 11 is deposited each comprises an outer annular surface 12 and annular surfaces 13 and 14 extending inwardly from the opposite side edges of the outer surface 12 in diverging relation to each other. The outer surface 12 is transversely straight and disposed parallel to the axis of the ring element and at right angles to the side walls 15 and 16. The surface 12 is preferably about .006 of an inch wide. The width should not be greater than approximately .015 of an inch and not less than approximately .003 of an inch. The diverging surfaces 13 and 14 are transversely straight and disposed preferably at an angle of approximately 35° to the surface 12 extended that is to a straight line coinciding with the surface 12 and extending vertically above and below the surface 12. This angle should not be greater than approximately 50° and not less than approximately 20°. If less than approximately 20°, the cylinder wall engaging surface of the chromium 11 plated onto such surfaces and the outer surface 12 would be too wide and too flat to effectively seat, scrape oil and seal compression. If such angle is more than approximately 50° the corners of the intersecting surfaces would be too sharp and the chrome plating 11 would be less likely to adhere to the body portion and there would be danger of the sharp edges scratching or shaving the cylinder wall.

The design above described of the outer peripheries of the annular portions 9 and 10 upon which the chromium is deposited not only provides a ring element which is highly efficient in use but also provides a ring element which may be readily and economically produced to great accuracy. The outer surface 12 being transversely straight can be machined to an accurately controlled diameter by taking a straight-lathe cut across the ring. Then each of the sides of the ring element can be beveled with straight edge tools to produce the diverging transversely straight surfaces 13 and 14. Straight edge tools are much easier to make and to keep functioning than our radius tools. The tool cost of producing the design shown in Figs. 1 and 3 is much less than of producing a design in which surfaces corresponding to surfaces 12, 13 and 14 are curved instead of flat and the tools for producing the design of Figs. 1 and 3 are much easier to maintain and the accuracy of the machine is much easier to control. After the surfaces 12, 13 and 14 are chrome plated the chrome surfaces may be buffed and polished to remove any existing high corners which would scrape the cylinder wall. The chromium 11 extends from the surface 12 onto the diverging surfaces 13 and 14 to help retain the chromium on the surface of the ring.

The chromium 11 plated onto the surfaces 12, 13 and 14 of the dimensions and in angular relation to each other as above described provides a relatively narrow line 18 of contact of the chromium with the cylinder wall 17, the width of this line approximating that of the surface 12. Relatively large oil pockets 19 and 20 are formed close to and on the opposite sides of the contact line 18, to facilitate long wear. This narrow contact line and the relatively large oil pockets 19 and 20 close to the line facilitates a relatively high unit of pressure of the ring element against the cylinder wall for close seating of the ring element to the cylinder wall during initial operation when the ring element is first installed, effectual sealing between the ring element and cylinder wall to prevent blow-by for maximum piston pressure, and effectual oil control and lubrication close to the contact line for long life of the ring element.

The cap of chromium 11, of the dimensions and shape above described, overcomes seating problems for such narrow line of contact does not require normal seating and will control oil and seal pressure almost instantly when first installed. Because of the extreme hardness of the chromium the line of contact wears very slowly and stays narrow throughout the life of the ring element. The angular disposition of the diverging surfaces 13 and 14 above described permits a substantial quantity of oil to stay very close to the frictional or contacting line 18 of the ring element against the cylinder wall. Another feature of this narrow contact line of the chromium against the cylinder wall is its remarkable freedom of frictional drag Such ring elements even when used in connection with an expander spring such as that shown at 7 in Fig. 1 produce no noticeable excess friction and the initial starting characteristics of such rings are remarkably free from drag so that the starter will spin the engine on the first start and no drag or resulting high temperatures from friction are found in the engine, even during the first few miles of operation.

In the embodiment of the invention shown in Fig. 4, the upper annularly projecting portion 21 of the cast iron ring element is provided with an outer surface 22 transversely straight and disposed parallel to the axis of the ring element and is provided with surfaces 23 and 24 transversely straight and diverging from the upper and lower edges of the outer surface. The intersection of the outer surface 22 with the diverging surfaces 23 and 24 is slightly curved as shown at 25 and 26. The angle between the diverging surfaces 23 and 24 is 90° or more and the surface 23 is more nearly parallel to the adjacent groove wall engaging surface 27 of the ring element than the other diverging surface 24. The width of outer surface 22 is preferably approximately that of the embodiment of Fig. 1. The chromium plating 28 on the outer surface extends over onto the diverging surfaces as shown. The lower annular projecting portion (not shown) of the ring element is similar to the upper annularly projecting portion 21 above described. The embodiment of Fig. 4 is otherwise similar to that of Fig. 1.

In the embodiment of the invention shown in Fig 5, the upper annularly projecting portions 29 of the cast iron ring element is provided with an outer surface 30 transversely straight and disposed parallel to the axis of the ring element. The upper edge of this surface merges into the outer edge of the adjacent ring groove wall engaging surface 31 of the ring element. The intersection of the surfaces 30 and 31 is slightly curved as shown at 32. The lower edge of the outer surface 30 merges into the inwardly and downwardly sloping transversely straight surface 33. The intersection of these surfaces is slightly curved as shown at 34. The width of the outer surface 30 is approximately that of the other embodiments. The chrome plating 35 on the outer surface 30 extends over onto the surfaces 31 and 33 as shown. The lower annular projecting portion (not shown) of the ring element is similar to the upper annular portion 29 above described. The embodiment of Fig. 5 is otherwise similar to that of Fig. 1.

I have illustrated and described very practical embodiments of my invention. I have not attempted to illustrate or describe other embodiments or adaptations, as it is believed that this disclosure will enable those skilled in the art to embody or adapt my invention as may be desired.

Having thus described my invention, what I claim as new and desire to secure by Letters Patent is:

1. A piston ring assembly comprising a split expansible ring element and an expander spring for forcing the ring element outwardly towards the cylinder wall, said ring element being of cast iron and having axially spaced radially outwardly projecting annular portions, each having an annular outer surface transversely straight and disposed parallel to the axis of the ring element, and each having annular surfaces transversely straight and disposed in diverging relation to each other and extending inwardly from the opposite side edges of said outer surface, the width of said outer surface being not greater than approximately .015 of an inch and not less than approximately .003 of an inch, the angle of each diverging surface to the outer surface extended being not greater than approximately 50° and not less than approximately 20°, and chrome plating on the outer surface extending over onto the diverging surfaces, said ring element having oil drain passageways extending from between said spaced annular portions radially inwardly through the ring element.

2. A piston ring assembly comprising a split expansible ring element and an expander spring for forcing the ring element outwardly towards the cylinder wall, said ring element being of cast iron and having axially faced radially outwardly projecting annular portions, each having an annular outer surface transversely straight and disposed parallel to the axis of the ring element, and each having annular surfaces transversely straight and disposed in diverging relation to each other and extending inwardly from the opposite side edges of said outer surface, the width of said outer surface being not greater than approximately .015 of an inch and not less than approximately .003 of an inch, the angle of each diverging surface to the outer surface extended being not greater than approximately 50° and not less than approximately 20°, and chrome plating on the outer surface extending over onto the diverging surfaces.

3. A piston ring comprising a split expansible ring element having axially spaced radially outwardly projecting annular portions, each having an annular outer surface transversely straight and disposed parallel to the axis of the ring element, and each having annular surfaces transversely straight and disposed in diverging relation to each other and extending from the opposite side edges of said outer surface, the width of said outer surface being not greater than approximately .015 of an inch and not less than approximately .003 of an inch, the angle of each diverging surface to said outer surface extended being not greater than approximately 50° and not less than approximately 20°, and chrome plating on said outer surface extending over onto said diverging surfaces.

4. A piston ring comprising a split expansible ring element having axially spaced radially outwardly projecting annular portions, each having an annular outer surface transversely straight and disposed parallel to the axis of the ring element, and each having annular surfaces transversely straight and disposed in diverging relation to each other and extending from the opposite side edges of said outer surface, the width of said outer surface being relatively narrow as compared to the axial thickness of the ring element, and chrome plating on said outer surface extending over onto said diverging surfaces.

5. A piston ring comprising a split expansible ring element having axially spaced radially outwardly projecting annular portions, each having an outer annular surface transversely straight and disposed parallel to the axis of the ring element, and each having annular surfaces transversely straight and extending inwardly from the opposite edges of said outer portion in diverging relation to each other, the width of said outer edge being approximately .006 of an inch, and chromium plating on said outer surface extending over onto said diverging surfaces.

6. A piston ring comprising a split expansible ring element having an outer annular surface transversely straight and disposed parallel to the axis of the ring element, said ring element having annular surfaces transversely straight and extending from the opposite side edges of the outer surface and in diverging relation to each other, the width of said outer surface being not greater than approximately .015 of an inch and not less than approximately .003 of an inch, the angle of each diverging surface to the outer surface extended being not greater than approximately 50° and not less than approximately 20°, and chrome plating on the outer surface extending over onto the diverging surfaces.

7. A piston ring comprising a split expansible element having an outer annular surface and annular surfaces extending inwardly from the opposite side edges of said outer surface, the outer surface being transversely straight and disposed approximately parallel to the axis of the ring element and being relatively narrow as compared to the axial thickness of the ring element, said inwardly extending surfaces being in part transversely straight and disposed in diverging relation to each other, and chrome plating on said outer surface extending onto said inwardly extending surfaces.

8. A piston ring comprising a split expansible element having an outer annular surface and annular surfaces extending inwardly from the opposite side edges of said outer surface, the outer surface being transversely straight and disposed approximately parallel to the axis of the ring element and being relatively narrow as compared to the axial thickness of the ring element, said inwardly extending surfaces being transversely straight and disposed in diverging relation to each other, and chrome plating on said outer surface extending onto said inwardly extending surfaces.

9. A piston ring comprising a split expansible ring element having an outer annular surface transversely straight and disposed parallel to the axis of the ring element, said ring element having annular surfaces extending inwardly from the opposite side edges of said outer surface in diverging relation to each other, the width of said outer surface being not greater than approximately .015 of an inch and not less than approximately .003 of an inch, one of said diverging surfaces coinciding with a ring groove side wall engaging surface of the ring element, and chrome plating on said outer surface extending onto said diverging surfaces.

HAROLD P. PHILLIPS.

REFERENCES CITED

The following references are of record in the file of this patent:

UNITED STATES PATENTS

| Number | Name | Date |
|---|---|---|
| 1,802,566 | Marien | Apr. 28, 1931 |
| 2,068,042 | Teetor | Jan. 19, 1937 |

FOREIGN PATENTS

| Number | Country | Date |
|---|---|---|
| 107,080 | Australia | Mar. 30, 1939 |